2 Sheets--Sheet 1

A. PHILIPPI.
Grain-Binders.

No. 142,040.

Patented August 19, 1873.

WITNESSES:
Chs Rousseau
Chas Meisner.

INVENTOR:
Alexander Philippi
per. Herthel & Co
Attys.

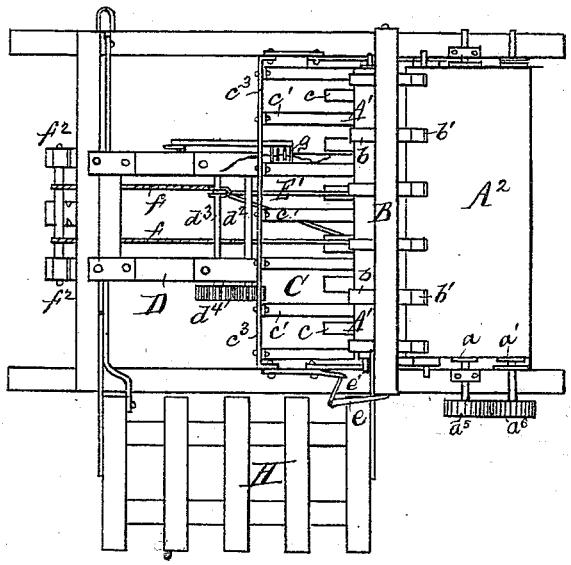
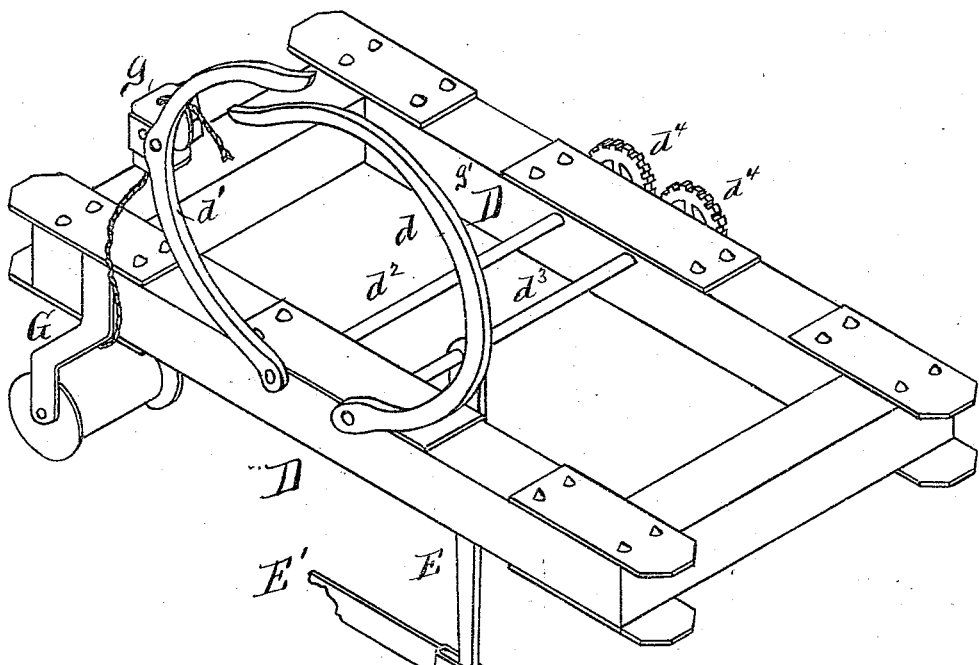

UNITED STATES PATENT OFFICE.

ALEXANDER PHILIPPI, OF ST. LOUIS, MISSOURI.

IMPROVEMENT IN GRAIN-BINDERS.

Specification forming part of Letters Patent No. 142,040, dated August 19, 1873; application filed April 21, 1873.

*To all whom it may concern:*

Be it known that I, ALEXANDER PHILIPPI, of St. Louis, in the county of St. Louis and State of Missouri, have invented an Improved Grain-Binding Machine, of which the following is a specification:

This invention is designed as an attachment to harvesters, being an improved grain-binder, which receives from the platform of the harvester, by means of reverse operating aprons, the grain or gavels into a receiving and detaining crib, from whence it is dropped upon a sliding binding-frame between compressing fingers, to be compressed by the same preparatory to being tied, the completed bundles being further retained and carried upon a pivoted platform until the required number of bundles has been completed, which can then be finally dropped from said platform in heaps for shocking.

The nature of this invention relates, first, to the formation of a basket or crib in sections, and the manner of operating the same by foot-pressure of operator to open and drop its contents, or to close and receive and retain the elevated gavels. Secondly, to the arrangement of a sliding binding-frame, carrying the compressing-fingers, and the manner of operating same by foot-pressure of the operator simultaneous with the connections that operate the crib above, so that when said finger devices are operated to close by the same motion the crib is closed, and, vice versa, when the fingers are operated to open, the crib shall open to let its grain drop between said fingers, preparatory to being compressed and tied into bundles. Lastly, to certain detail construction of parts, all of which will now more fully appear.

To enable those herein skilled to make and use my said improvements, I will now more fully describe the same, referring to—

Figure 1:
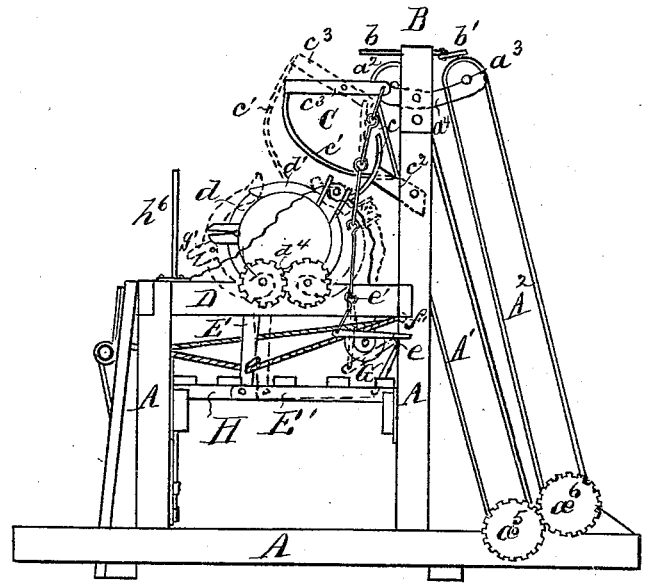
Figure 2:
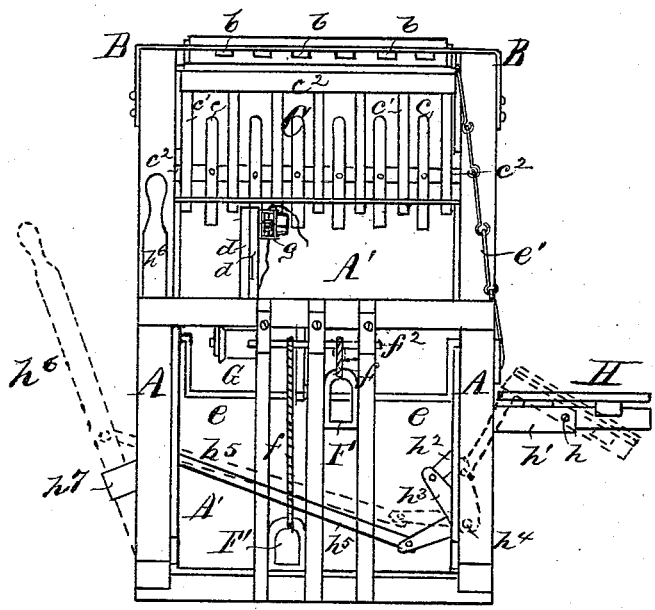

Figure 1, Sheet 1, as a rear elevation; to Fig. 2, Sheet 1, as a side elevation; to Fig. 3, Sheet 2, as a top plan; and to Fig. 4, Sheet 2, as an enlarged perspective view of binding sliding frame with its operating devices.

A represents a proper frame, upon which the operating mechanism is mounted. In the side of frame A, I arrange reverse-revolving aprons $A^1 A^2$, consisting of suitable cloth material, properly slatted, passing round respective upper and lower drums-shafts $a$ $a^1$ $a^2$ $a^3$. The lower drums $a$ $a^1$ are supported in proper journal-bearings on frame A, the upper drums $a^2$ $a^3$ turning in side supports $a^4$, which are bolted to the top of frame A. The rotary motion to the respective aprons $A^1 A^2$ is imparted by the driving-wheel of the reaper, having its driving-gear meshing with a pinion, $a^5$, on the drum-shaft $a$, said pinion further meshing with a pinion, $a^6$, on the drum-shaft $a^1$. (See Fig. 1 and 3.) The aprons are thus made reverse acting. The platform of the reaper will be provided with a revolving apron, so as to carry the grain in line between the aprons $A^1 A^2$, which further take up the grain and elevate the same to the top of the apron. The grain at top is prevented from being carried over the apron $A^2$, being guided and passed over the top of the apron $A^1$ by a comb, consisting of frame B with cross-slats $b$. (See Figs. 1 and 3.) The comb B is securely bolted to the top of frame A, and further has its slats $b$ provided with flexible ends $b^1$, Figs. 1 and 3; the latter especially resting on top of the apron $A^2$ prevents the grain being passed over the same. The elevated grain is received into a basket or crib, C. The crib is formed of a rear and front section, which consist of upright slats $c$ $c^1$, curved inward to close between each other at bottom. (See Figs. 1 and 3.) The rear section $c$, by its cross-frame $c^2$, is bolted permanently to frame A, Figs. 1 and 2, while the front or movable section is pivoted by its frame $c^3$ to the side supports $a^4$, Figs. 1 and 3, the object of thus forming the crib C in section, being to open and close the same to drop or retain the grain preparatory to the action of the compressing-finger devices. D, Figs. 1, 3, and 4, is a binding-frame; this is secured adjustably in a proper manner, so as to have a sliding movement upon the top of the frame A, the sliding motion of the frame D being important to suit the position of the compressing-fingers to the length or sizes of the sheaves preparatory to a proper binding of same in the middle. $d$ $d^1$ are ordinary compressing-fingers, these being keyed to ends of the respective shafts $d^2$ $d^3$, which turn in proper journal-bearings on the binding-frame D. (See Fig. 4.)

It being my object to operate by the foot-pressure of operator the finger devices $d\ d^1$, to open and close simultaneous with the opening and closing action of the crib, therefore, the operative connections of said parts with relation to each other are as follows: The respective shafts $d^2\ d^3$ are provided with meshing-pinions $d^4$. Further, the shaft $d^3$ connects with an arm, E, to the lower end of which a lever, $E^1$, is pivoted, the other end of said lever connecting loosely to a crank-shaft, $e$. The crank-shaft $e$ turns in proper bearings secured to frame A, Figs. 1 and 2, and has one end connected to a chain attachment, $e^1$, the other end of which connects to the end of the movable section $c^3$ of the crib. (See Figs. 1 and 2.) Further, the side of the frame A has secured thereto three uprights or frames, in the side grooves of which are arranged to slide stirrups F $F^1$, clearly shown in Fig. 2. To the stirrup F one end of a rope attachment, $f$, connects and is passed over a pulley-shaft, $f^2$, from thence looped and connected to the lower end of the arm E, from thence passed over a similar pulley-shaft, $f^2$, from thence returned to connect to the stirrup $F^1$, in manner indicated in Figs. 1, 2, and 3. When, therefore, the stirrup F is operated by a vertical foot-pressure the finger devices $d\ d^1$ open by the action of the arm E, and at same time this, by means of the lever $E^1$, actuates the crank-shaft $e$ to turn so that, by the chain $e^1$, the crib is operated to open. Similarly, by the said connecting-parts, the closing action is achieved by the foot-pressure of the operator upon the stirrup $F^1$. The binding-frame D being adjusted in position to receive the grain the crib is operated to open and drop sufficient grain between the finger devices $d\ d^1$, as desired. The grain is next compressed into a bundle by the foot-pressure of the operator closing the finger devices, preparatory for the binding or tying action.

The binding or tying of the bundle is done as follows: A spool-frame, G, is secured to the under side of the binding-frame D, Figs. 1 and 2, and 4. The spool is supported by its shaft to turn properly in the spool-frame G. The end of the twine or cord is passed round a pulley-wheel, $g$, this being arranged to turn properly in a pulley-frame, which is secured to one of the finger devices $d^1$, (see Fig. 4,) the object of thus securing the twine devices $g$ to the finger $d^1$ being to utilize the action of same to bring the twine within ready reach of the operator, and otherwise keeping the twine when not used out of way of operator. The twine lies under the grain before compression, and is returned by operator to connect or be knotted to its supply. The knot completed, the twine is cut by a cutter or knife, $g'$, attached to the finger device $d$. See Figs. 1 and 4. The completed bundle when released is next thrown by the operator upon a slatted frame or platform, H. The platform H is pivoted at $h$ to extension-bearings $h^1$, which are bolted to frame A, Fig. 2. The inner end of the platform H is pivoted to a link, $h^2$, which has its other end pivoted to one end of an angle-lever, $h^3$, which is pivoted at $h^4$ to frame A. See Fig. 2. The other end of the angle-lever $h^3$ has pivoted thereto a connecting rod or bar, $h^5$, which has its other end pivoted to a hand-lever, $h^6$, which has its fulcrum, as clearly indicated, in Fig. 2. $h^7$ is a guide, secured to frame A for the hand-lever. By this manner of connection, as readily apparent, the platform H can be tilted by the operator to drop whatever bundles it carries.

The importance of the platform H consists in the carrying of the completed bundles and piling, as desired, the bundles for shocking purposes, all of which is done as the machine travels along and the binding of the grain is required.

My said improvements are simple in construction, readily arranged, and peculiarly adapted in operation to save time, labor, and expense.

Having thus fully described my improvements, what I claim is—

A sliding binding-frame, D, carrying finger devices $d\ d^1$, shafts $d^2\ d^3$, pinions $d^4$, arm E, lever $E^1$, crank-shaft $e$, chain $e^1$, crib C, rope $f$, stirrup F, all combined to operate as and for the purpose set forth.

2. The frame D, fingers $d\ d^1$, shafts $d^2\ d^3$, pinions $d^4$, arm E, lever $E^1$, rope $f$, pulley-shafts $f^1\ f^2$, stirrups F $F^1$, when arranged to operate as and for the purpose set forth.

3. The combination of the crib C, chain $e^1$, crank-shaft $e$, lever $E^1$, arm E, pinions $d^4$, shafts $d^2\ d^3$, fingers $d\ d^1$, rope $f$, pulley-shafts $f^1\ f^2$, and stirrups F $F^1$, as and for the purpose set forth.

In testimony of said invention I have hereunto set my hand.

ALEXANDER PHILIPPI.

Witnesses:
WILLIAM W. HERTHEL,
CHAS. MEISNER.